United States Patent
Jung et al.

(10) Patent No.: US 7,843,538 B2
(45) Date of Patent: Nov. 30, 2010

(54) DISPLAY PANEL

(75) Inventors: Mee-Hye Jung, Gyeonggi-do (KR); Ji-Won Sohn, Seoul (KR); Sung-Hoon Yang, Gyeonggi-do (KR); Jin-Won Park, Gyeonggi-do (KR); Seon-Ah Cho, Busan (KR)

(73) Assignee: Samsung Electronics Co., Ltd. (KR)

( * ) Notice: Subject to any disclaimer, the term of this patent is extended or adjusted under 35 U.S.C. 154(b) by 334 days.

(21) Appl. No.: 11/747,014

(22) Filed: May 10, 2007

(65) Prior Publication Data

US 2007/0268437 A1    Nov. 22, 2007

(30) Foreign Application Priority Data

May 18, 2006   (KR) ...................... 10-2006-0044557

(51) Int. Cl.
*G02F 1/1337*    (2006.01)
(52) U.S. Cl. ...................................................... 349/129
(58) Field of Classification Search ................. 349/129, 349/144
See application file for complete search history.

(56) References Cited

U.S. PATENT DOCUMENTS 7,408,605 B2 *  8/2008  Kwag et al. ................. 349/129

2002/0140892 A1  10/2002  Baek et al.
2004/0141133 A1 *  7/2004  Sonoda et al. .............. 349/142
2005/0243231 A1  11/2005  Horiguchi et al.

FOREIGN PATENT DOCUMENTS

| JP | 11052381 | 2/1999 |
| JP | 2003270653 | 9/2003 |
| WO | WO03/007064 | 1/2003 |

OTHER PUBLICATIONS

European Search Report for European Application No. 07009757.1-2205, 6 pages.

* cited by examiner

*Primary Examiner*—David Nelms
*Assistant Examiner*—Phu Vu
(74) *Attorney, Agent, or Firm*—Innovation Counsel LLP

(57) ABSTRACT

In a liquid crystal display device, the device includes a first substrate, a second substrate and a liquid crystal layer interposed therebetween. The first substrate includes a pixel electrode, a thin film transistor connected to the pixel electrode, and also a hitch to connect both a lower and upper electrode of the pixel electrode. The second substrate includes a common electrode having a lower domain division part and an upper domain division part, in which each of domain division part is formed at the position corresponding to the lower and upper electrode of the pixel electrode, respectively. Through the electric field controller connected at both sides of the upper electrode of the pixel electrode, quality of display image can improve without a darkening area occurring at one part of the unit pixel.

20 Claims, 14 Drawing Sheets

DISPLAY PANEL

BACKGROUND OF THE INVENTION

1. Field of the Invention

This application claims the priority of Korean Patent Application No. 10-2006-044557 filed on May 18, 2006. The entire disclosure of application is incorporated herein by reference.

2. Description of the Related Art

This invention relates to a display panel, more specifically to a liquid crystal display device to improve image quality of the display. The liquid crystal display device includes a liquid crystal display panel which displays images based on light transmittance and a back-light assembly which provides light from the back side of the liquid crystal display panel.

Generally, the liquid crystal display device includes an upper polarizer attached on one side of the liquid crystal display panel and a lower polarizer attached on the other side of the liquid crystal display. The axes of the upper and the lower polarizers are formed perpendicular to each other.

The liquid crystal display device includes a first substrate which includes a thin film transistor and a pixel electrode, a second substrate which includes a color filter and a common electrode, and a liquid crystal layer arranged between the first substrate and the second substrate.

The pixel electrode is formed on the first substrate in the form of a matrix and has a rectangular shape in plan view. The common electrode is formed on the second substrate.

There are several kinds of operation modes in the liquid crystal display (e.g, a Twist Nematic (TN) mode, an In-Plan Switch (IPS) mode and a vertical alignment (VA) mode). Among theses operation modes, the VA mode has been employed more than other modes because the VA mode has better response speed.

Moreover, the VA mode has an improved viewing angle, for example, the PVA (Patterned Vertical Alignment) mode and the MVA (multi-domain vertical alignment) mode.

Each domain of the VA, PVA, MVA modes is aligned with a vertical or a horizontal direction along one side of the pixel electrode, and can be arranged to be at a 45-degree angle to the axis of the upper or lower polarizer.

When the domain is formed in a vertical or a horizontal direction along one side of the pixel electrode, most of the liquid crystals are arranged in a vertical direction in a domain by an electric field applied between the pixel electrode and the common electrode. The liquid crystals, however, positioned along both edges of the domain may be formed parallel to one of the axes of the lower or the upper polarizer.

Therefore, a dark area which does not allow light to penetrate may occur in one part of a pixel, thereby adversely affecting the quality of the display.

SUMMARY OF THE INVENTION

One purpose of the present invention is to provide an array panel and a display device which can improve the quality of a display image.

One embodiment of the present invention is achieved by a liquid crystal display device comprising: a lower substrate including a pixel electrode and a thin film transistor coupled to the pixel electrode, an upper substrate including a common electrode, and a liquid crystal layer interposed between the lower substrate and the upper substrate, wherein, the pixel electrode includes a main body part and an electric field controller connected to a lateral surface of the main body part.

The main body part includes a lower main body part, an upper main body part and a hitch to electrically connect the lower and the upper main body parts.

The common electrode includes a lower domain division part and an upper domain division part. The upper domain division part faces the center of the upper main body part in a second direction and the lower main body part, which is connected to the upper main body part via the hitch that is connected to a lower electric field controller.

An angle between the lateral side of the main body part and a lateral side of the upper electric field controller is 2 to 22.5 degree in the convexed portion.

The upper electric field controller may be a convex portion which protrudes from a lateral side of the main body part or a concave portion which is removed from a lateral side of the main body part.

The upper electric field controller is formed symmetrically at both lateral sides of the upper main body part.

The main body part includes cutting portions at corners of the lower and upper main body parts which are rectangular shapes.

Each of the lower domain division part and an upper domain division part includes an opening area or a protrusion area.

BRIEF DESCRIPTION OF THE DRAWINGS

The features and advantages of this invention are apparent from the detailed description below, with reference to the following drawings.

DETAILED DESCRIPTION OF THE EMBODIMENTS

Figure 1:
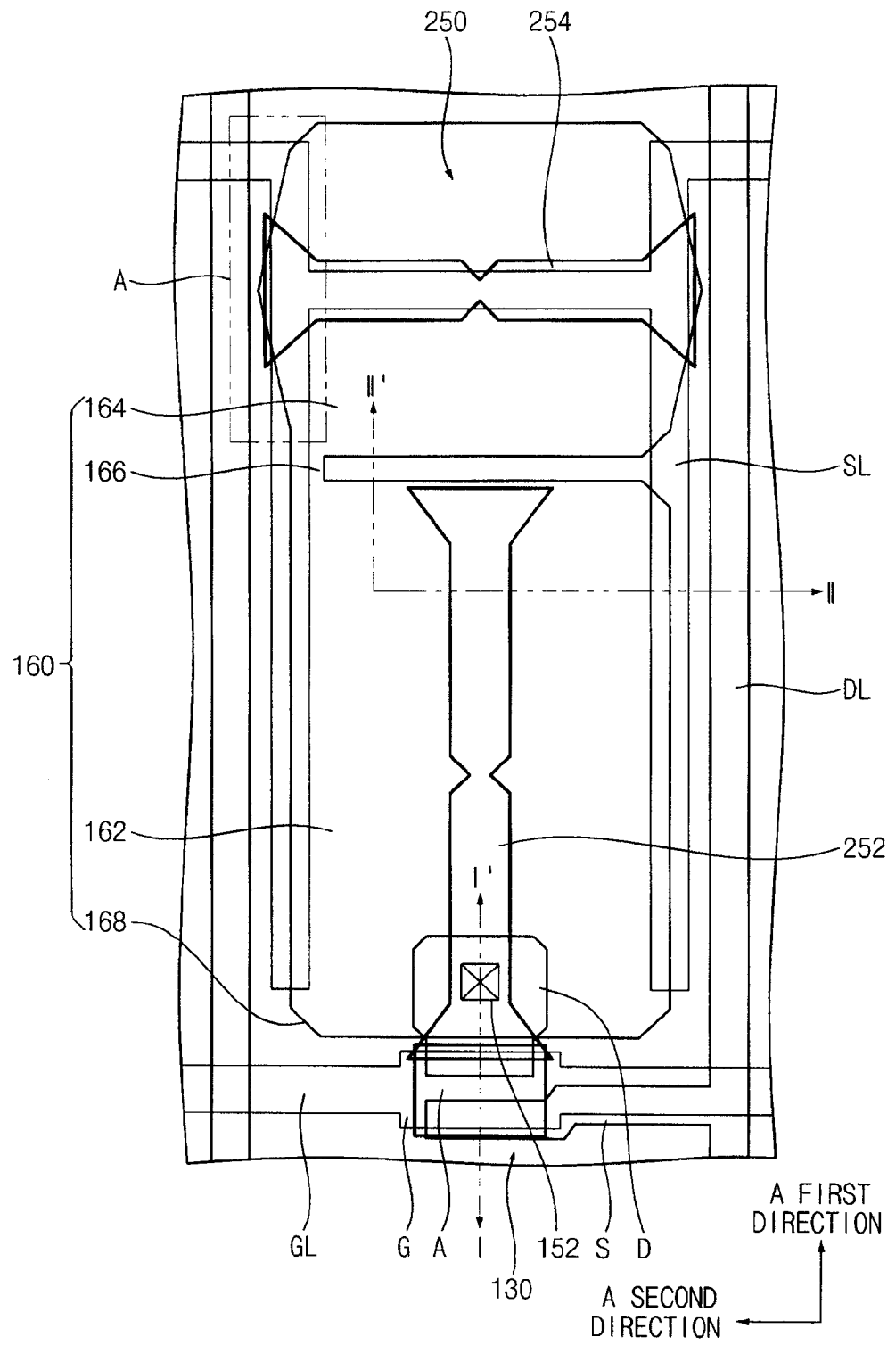
FIG. 1 is a plan figure showing a pixel of a display panel, according to a first embodiment of this invention.
Figure 2:
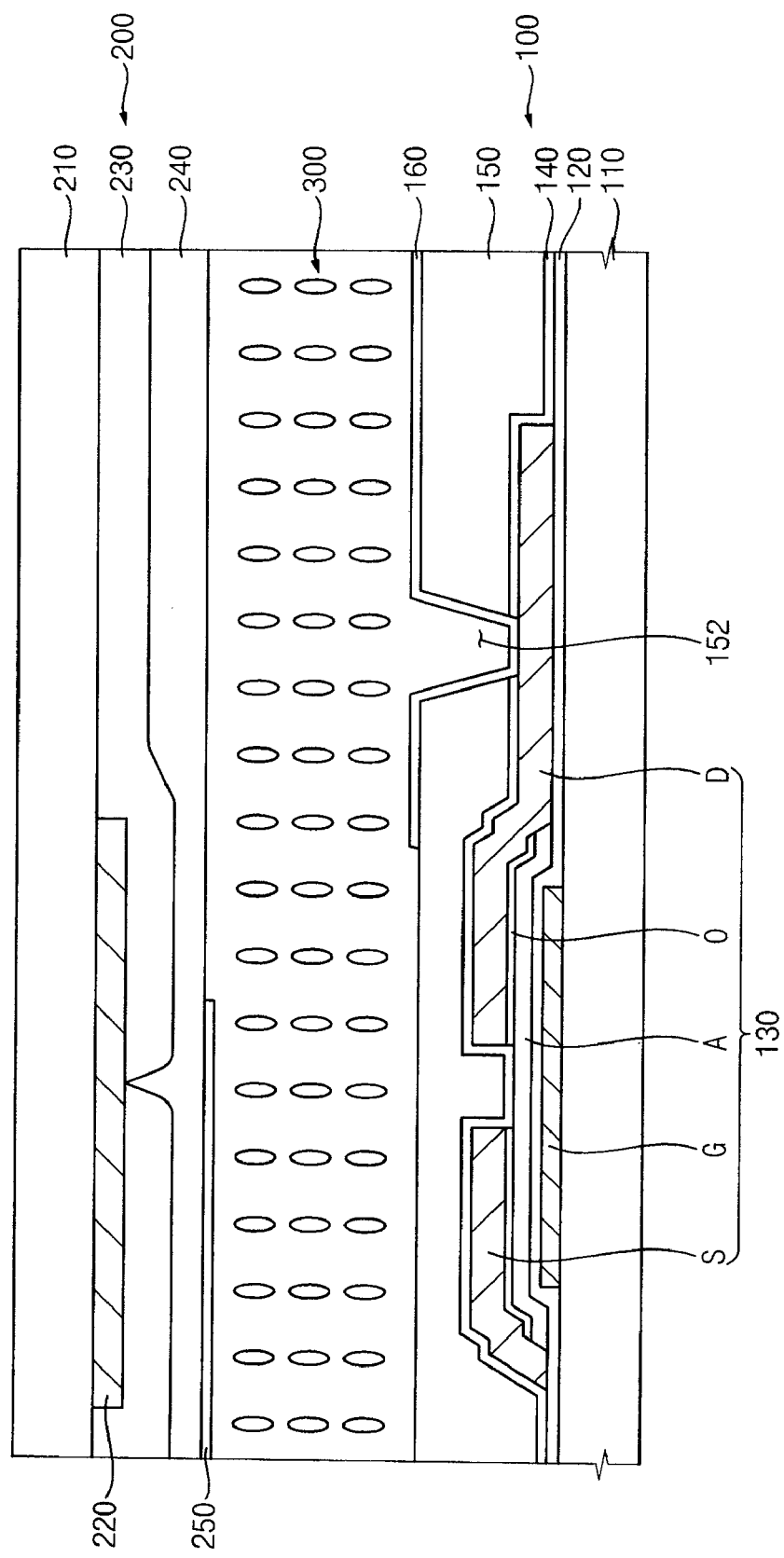
FIG. 2 and FIG. 3 are cross sectional views taken along lines I-I' and II-II' of FIG. 1, respectively.
Figure 3:
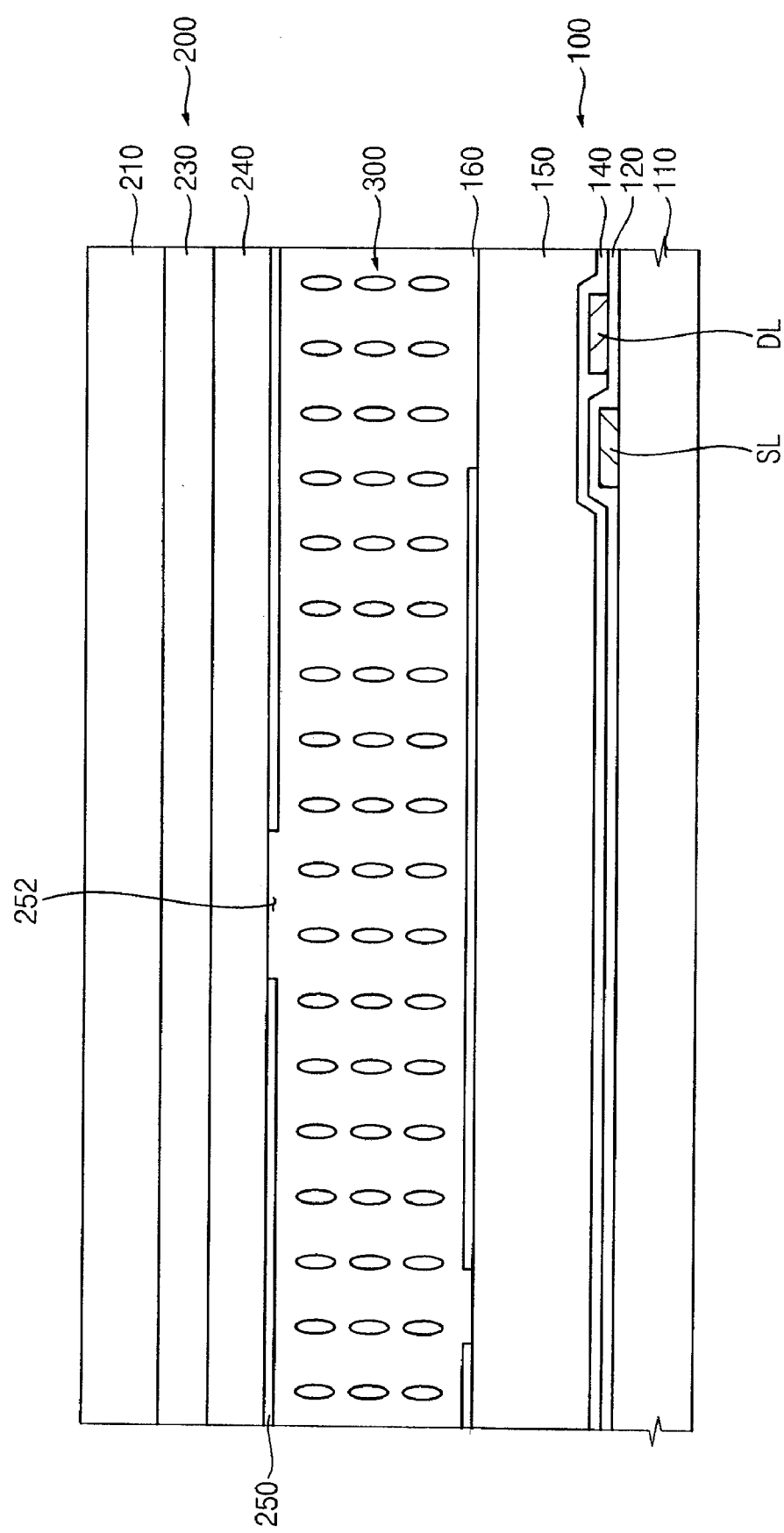

FIG. 1 is a plan figure showing a pixel of a display panel according to a first embodiment of this invention. FIG. 2 and FIG. 3 are cross sectional views taken along lines I-I' and II-II' of FIG. 1.

Referring to FIG. 1 to FIG. 3, a display panel includes a lower substrate 100, an upper substrate 200 and a liquid crystal layer 300 interposed therebetween. The lower substrate 100 includes a first transparent substrate 110, a gate line GL, a storage line SL, a gate insulator 120, a thin film transistor 130, a protection layer 140, an organic insulator layer 150 and a pixel electrode 160.

The first transparent substrate 110 is formed of a transparent material (e.g., glass, quartz, sapphire or transparent synthetic resin) in the shape of a disk.

The data line DL and the gate line GL are formed orthogonal to each other. However, it is possible for two lines to be crossed at a predetermined angle.

Specifically, the data line DL extends in a first direction D1 (row direction) and the gate line GL extends in a second direction D2 (column direction). The other data lines DL are formed parallel to each other in a second direction D2 (column direction). Also the other gate lines GL are formed parallel to each other in the first direction D1 (row direction).

Each pixel includes a thin film transistor 130 and a pixel electrode 160, in which the thin film transistor 130 is formed at the intersection of the gate line GL and data line DL.

The gate line GL and storage line SL are formed on a first transparent substrate 110. The storage line SL is shown having an "H" shape in a unit pixel and extends in the second direction D2.

The gate insulator 120 is formed over the first transparent substrate 110 in order to cover the gate line GL and the storage line SL. The data line DL is formed over the gate insulator 120 in order not to be electrically connected with the gate line GL.

The thin film transistor 130 includes a gate electrode G, a source electrode S, a drain electrode D, an active layer A and an ohmic contact layer O.

A gate electrode G extends from the gate line GL in the first direction D1, which is vertical from the direction of the gate line GL.

The active layer A is formed on the gate electrode G with semiconductor material such as amorphous silicon a-Si.

The source electrode S extends in the second direction D2, which is vertical from the direction of the data line DL, from the data line D and overlaps the active layer A.

The drain electrode D is formed apart from the source electrode S and partially overlaps the active layer A.

An ohmic contact layer O is interposed between the active layer A and the source electrode S, and between the active layer A and the drain electrode D.

The ohmic contact layer O is formed of a highly doped amorphous silicon (n+a-Si) so that the contact resistances between the active layer A and the source electrode S and between the active layer A and the drain electrode D can be reduced.

The protection layer 140 is formed over the gate insulator 120 in order to cover the thin film transistor 130 so that the thin film transistor 130 can be protected from physical or chemical damage.

The organic insulator 150 planarizes the whole surface of the protection layer 140. A contact hole 152 is formed in the drain electrode D by partially etching the protection layer 140 and organic insulator 150.

The pixel electrode 160 is formed on the organic insulator 150 every unit pixel. The pixel electrode 160 is electrically coupled to the drain electrode D via the contact hole 152.

The pixel electrode 160 is formed of a transparent conductive material such a tin oxide indium (ITO), zinc oxide indium (IZO) or amorphous Indium tin oxide (a-ITO). The pixel electrode 160 is described in more detail in conjunction with the drawings.

The upper substrate 200 includes a second transparent substrate 210, a light blocking layer 220, a color filter 230, a planarization layer 240 and a common electrode 250.

The second transparent substrate 210 is formed of a transparent material in the same disc shape as the first transparent substrate 110.

The light protection layer 220 is partially formed on the second transparent substrate 210 facing the gate line GL, the data line DL and the thin film transistor 130 of the first transparent substrate 110, so that the passage of light is interrupted.

The color filter 230 is formed to cover sufficiently the light blocking layer 220 on the second transparent substrate 210 corresponding to pixel electrode 160. The color filter 230 may be red, green and blue.

The planarization layer 240 is formed on the color filter 230 and planarizes the surface of the upper substrate 200. The planarization layer 240 may be transparent and non-conductive organic material.

The common electrode 250 is formed on the planarization layer 240 with the same transparent conductive material as that of the pixel electrode 160.

A liquid crystal layer includes liquid crystals interposed between the lower substrate 100 and the upper substrate 200.

Figure 4:
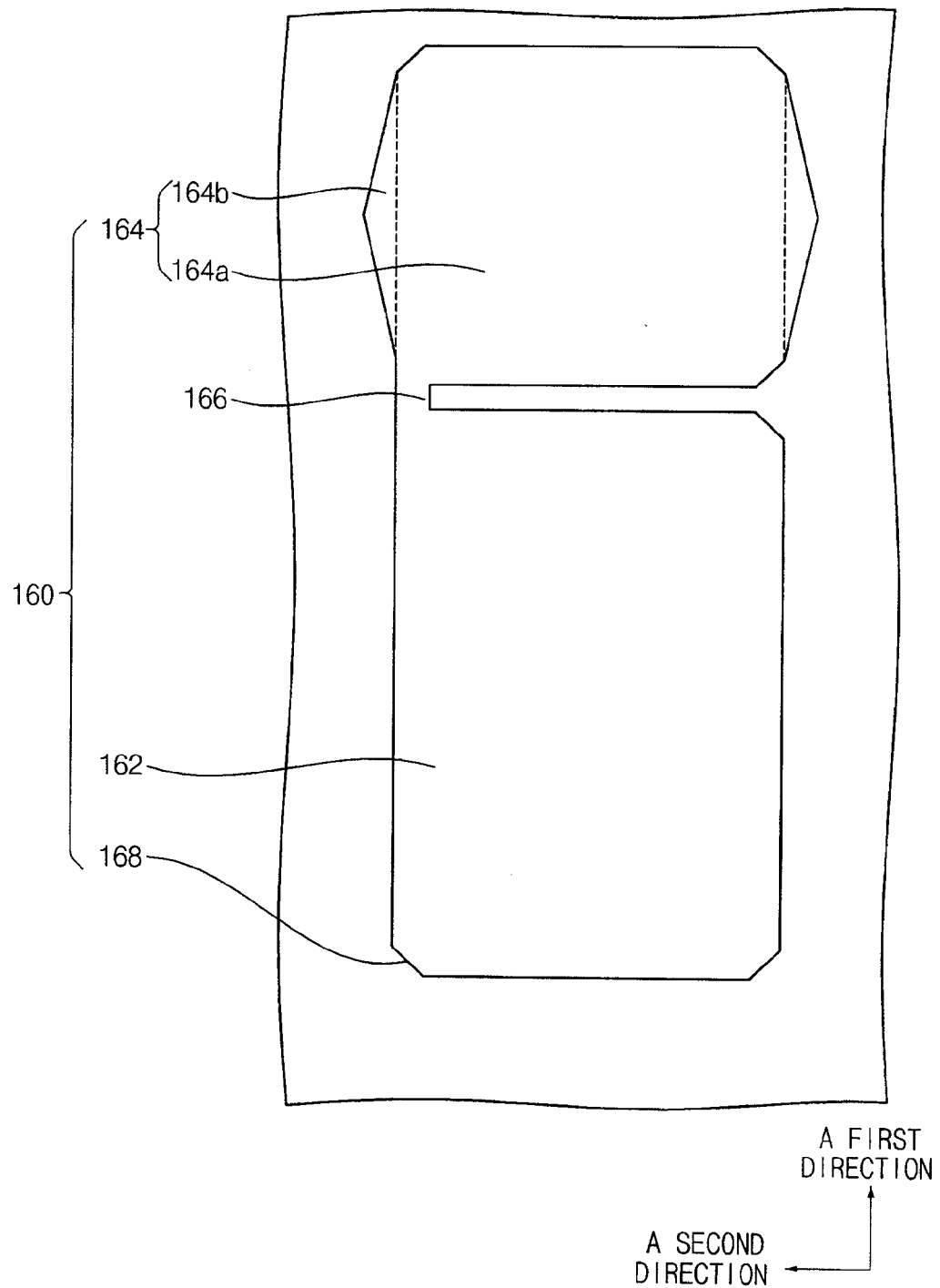
FIG. 4 is a plan figure showing a pixel electrode for the pixel of FIG. 1.

The liquid crystals in the liquid crystal layer 300 are rearranged by an electric field applied between the pixel electrode 160 and the common electrode 250. Through rearrangement of the liquid crystals in the liquid crystal layer 300, the light transmittance of the externally applied light is adjusted to display the required image. FIG. 4 is a plan figure showing a pixel electrode for the pixel of FIG. 1.

Referring to FIG. 4, the pixel electrode 160 includes a lower part electrode 162, an upper part electrode 164 and a hitch 166.

The lower part electrode 162 is formed apart from the gate line GL in the first direction D1. The lower part electrode 162 is electrically coupled to the drain electrode of the thin film transistor 130 via the contact hole 152. The lower part electrode 162 may be rectangular.

The upper part electrode 164 is formed apart from the lower part electrode 162 in the first direction D1. The lower part electrode 162 and the upper part electrode 164 are electrically coupled by the hitch 166.

The upper part electrode 164 includes a main body part 164a and an electric field controller 164b. The main body part 164a is electrically coupled with the lower part electrode 162 through the hitch 166 and may be rectangular.

The electric field controller 164b is extended in the second direction D2 from both sides of the main body part 164a. The electric field controller 164b may be formed as an isosceles triangle or an equilateral triangle in plan view.

The main body part 164a including the lower part electrode 162 and upper part electrode 164 has removed portions 168 at its corners. Each removed portion 168 is removed from the corner of the main body part 164a and may be 45 degree relative to the first direction D1 or the second direction D2.

Figure 5:
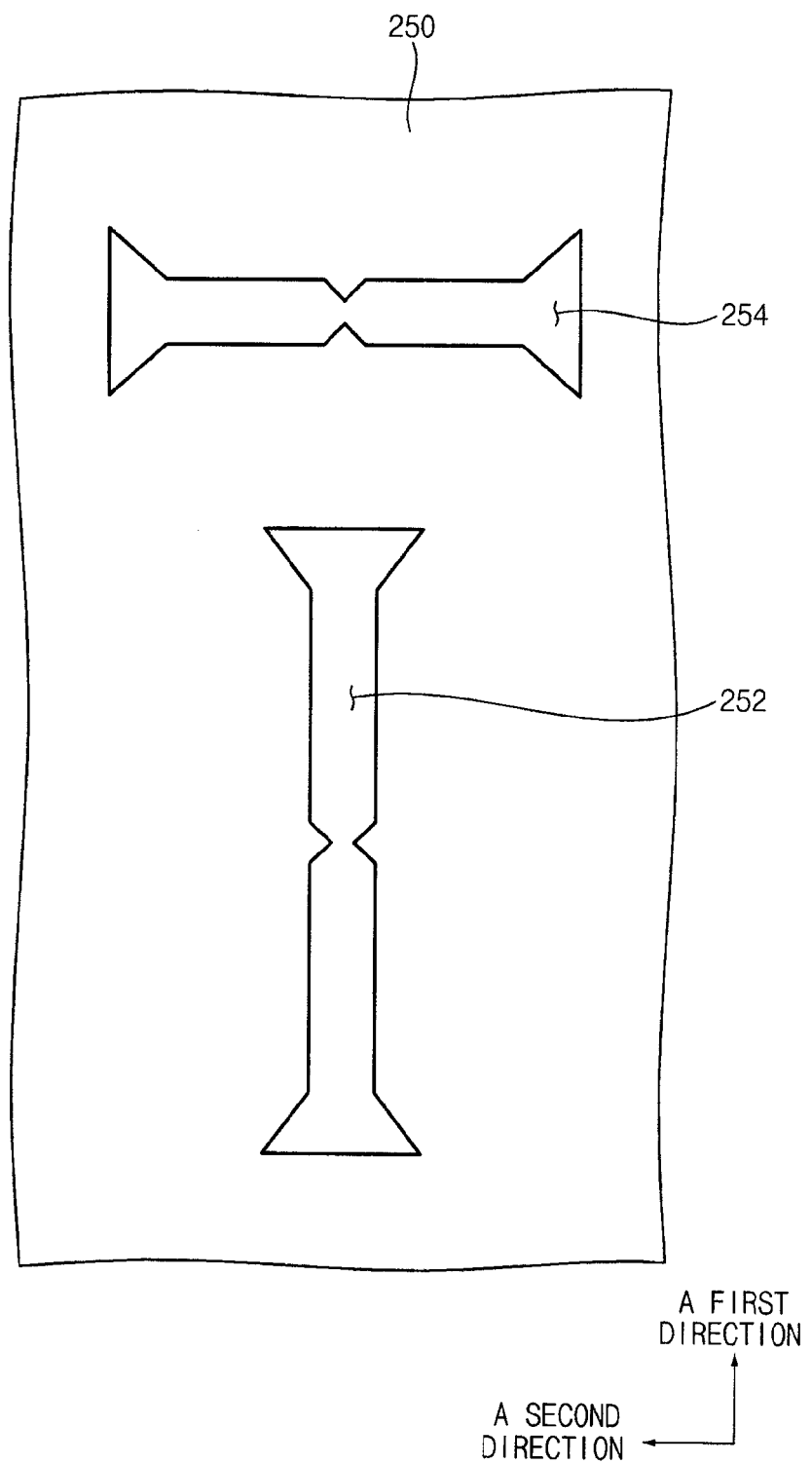
FIG. 5 is a plan figure showing a common electrode of the pixel of FIG. 1.

FIG. 5 is a plan figure showing a common electrode of the pixel of FIG. 1.

Referring to FIG. 5, the second substrate 200 includes a lower domain division part 252 and an upper domain division part 254. The lower and upper domain division parts 252, 254 are openings formed by etching one part of the common electrode 250. The lower and upper domain division parts 252, 254 may be protrusions projected from the surface of the common electrode 250.

Specifically, the lower domain division part 252 is formed corresponding to a lower part electrode 162 at a position along the first direction D1.

It is desirable that the lower domain division part 252 faces the center of the lower part electrode 162.

Both sides of the lower domain division part 252 may be formed as trapezoids symmetrical about the first direction D1, and the center of the lower domain division part 252 may be concave in the form of a triangle in the second direction D2.

On the other hand, the upper domain division part 254 faces the upper part electrode 164. Desirably, the upper domain division part 254 is formed along the second direction D2 crossing the center of upper part electrode 164.

Both sides of the upper domain division part 254 may be trapezoidal symmetrical about the direction D1, and the center of the upper domain division part 254 may have a concave portion in the form of a triangle in the first direction D1.

Figure 6:
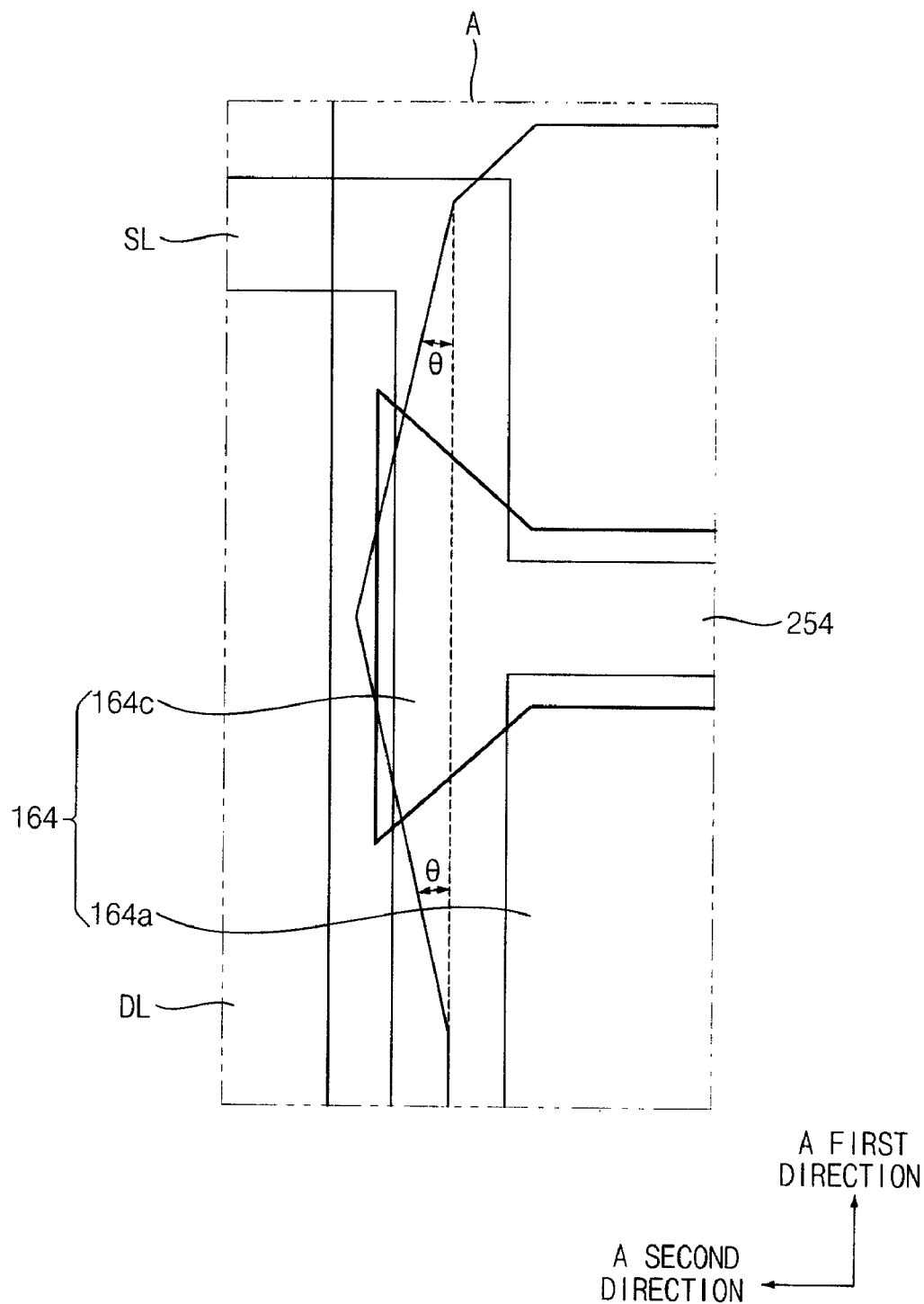
FIG. 6 is a plan figure showing an "A" section of FIG. 1.

FIG. 6 is a plan figure showing the "A" section of FIG. 1.

Referring to FIG. 6, an electric field controller 164c has the shape of an isosceles triangle that is symmetrical above the center line of the upper domain division part 254. The electric field controller 164c is desirably formed to be overlapping edges of the upper domain division part 254.

The angle θ between the lateral side of the electric field controller 164c and the lateral side of the main body part 164a may be 2~22.5 degrees.

The upper domain division part 254 faces one part of a storage line SL. Specifically, the storage line SL may be formed in the same second direction as the upper part domain division part 254.

The electric field controller 164c is formed at the lateral sides of the main body part 164a to control the direction of electric field formed on the lateral sides of the main body part 164a.

As the electric field controller 164b is formed at the lateral side of the main body part 164a, the electric field formed at the edges of the main body part 164a can be controlled in order not to have 45 degree angles in either the first or second direction.

As a result, liquid crystals corresponding to the lateral sides of the main body part 164a arranged in liquid crystal layer 300 are not arranged at 45 degree angles to darken the pixel.

Figure 7:
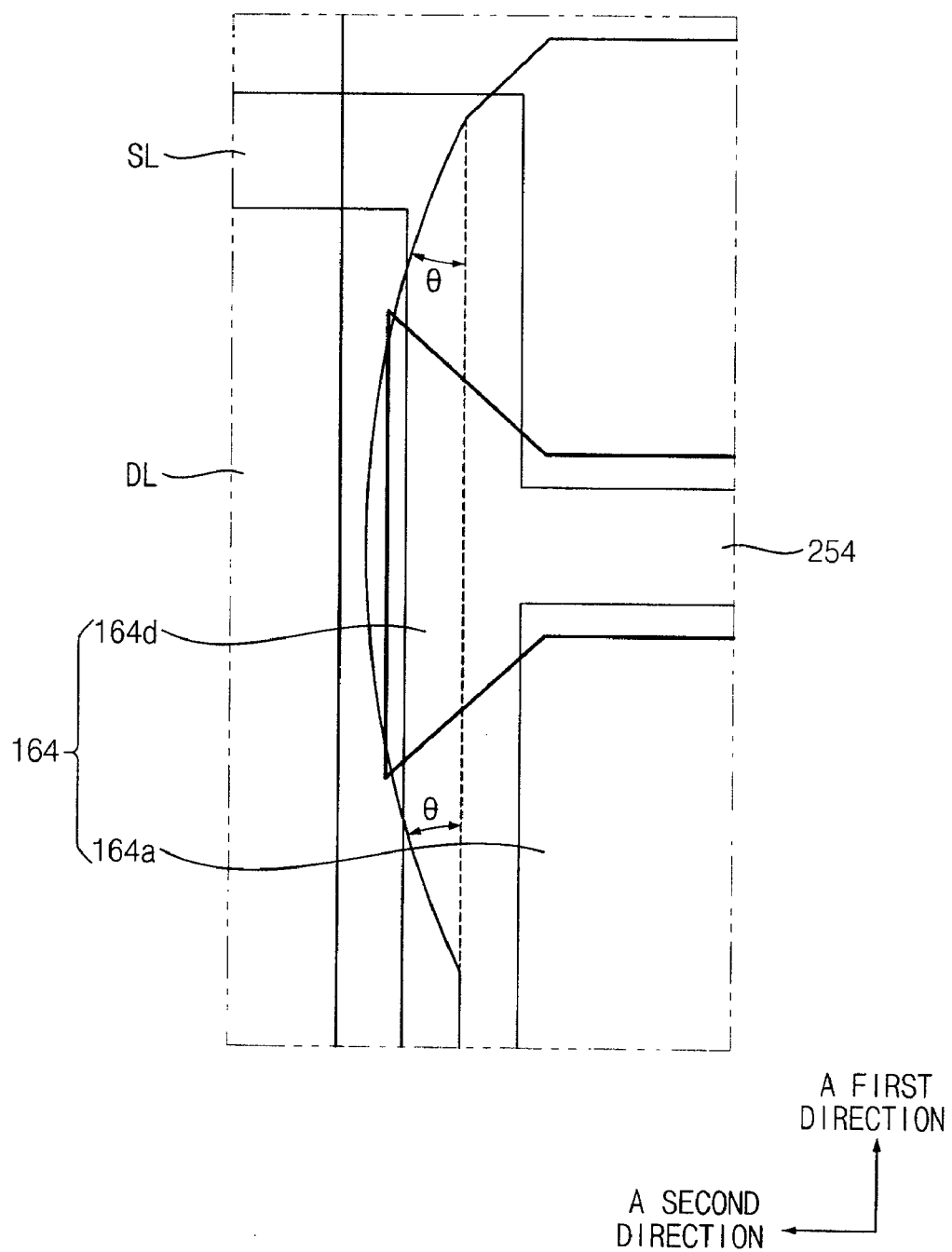
FIG. 7 is a plan figure showing one part of pixel according to second embodiment of this invention.

FIG. 7 is a plan figure showing one part of a pixel, according to second embodiment of this invention. A display panel according to this embodiment is similar to the first embodiment, so that all features having the same structure are denoted by the same reference numerals.

Referring to FIG. 7, the electric field controller 164d is convex and protrudes in the second direction from the lateral sides of the main body part 164a.

Specifically, the electric field controller 164d is half-elliptical in plan view and is desirably symmetrical about the center line of the upper domain division part 254. The electric field controller 164d desirably overlaps the lateral sides of the upper domain division part 254.

The angle θ between the lateral side of the electric field controller 164d and the lateral side of the main body part 164a may be 2~22.5 degree.

Figure 8:
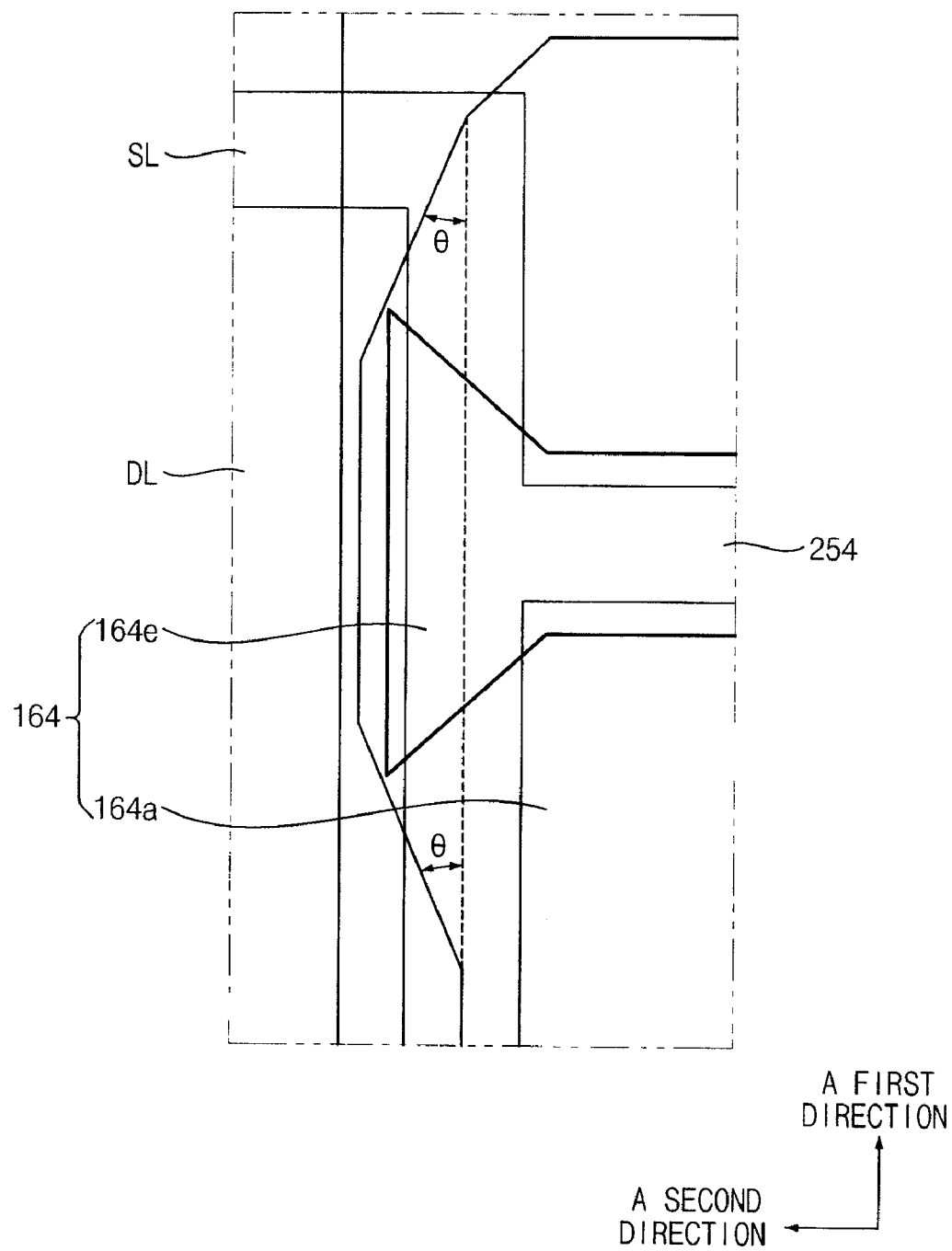
FIG. 8 is a plan figure showing one part of the pixel according to a third embodiment of this invention.

FIG. 8 is a plan figure showing one part of a unit pixel, according to a third embodiment of this invention.

Referring to FIG. 8, the electric field controller 164e is convex and protrudes in the second direction from the lateral sides of the main body part 164a.

Specifically, the electric field controller 164e is trapezoidal in plan view and is desirably symmetrical about the center line of the upper domain division part 254. The electric field controller 164e desirably overlaps the lateral sides of the upper domain division part 254.

The angle θ between the lateral side of the electric field controller 164e and the lateral side of the main body part 164a may be 2~22.5 degrees.

In order to cover the upper domain division part 254, the electric field controller 164e may be the same as or larger than the upper domain division part 254.

Figure 9:
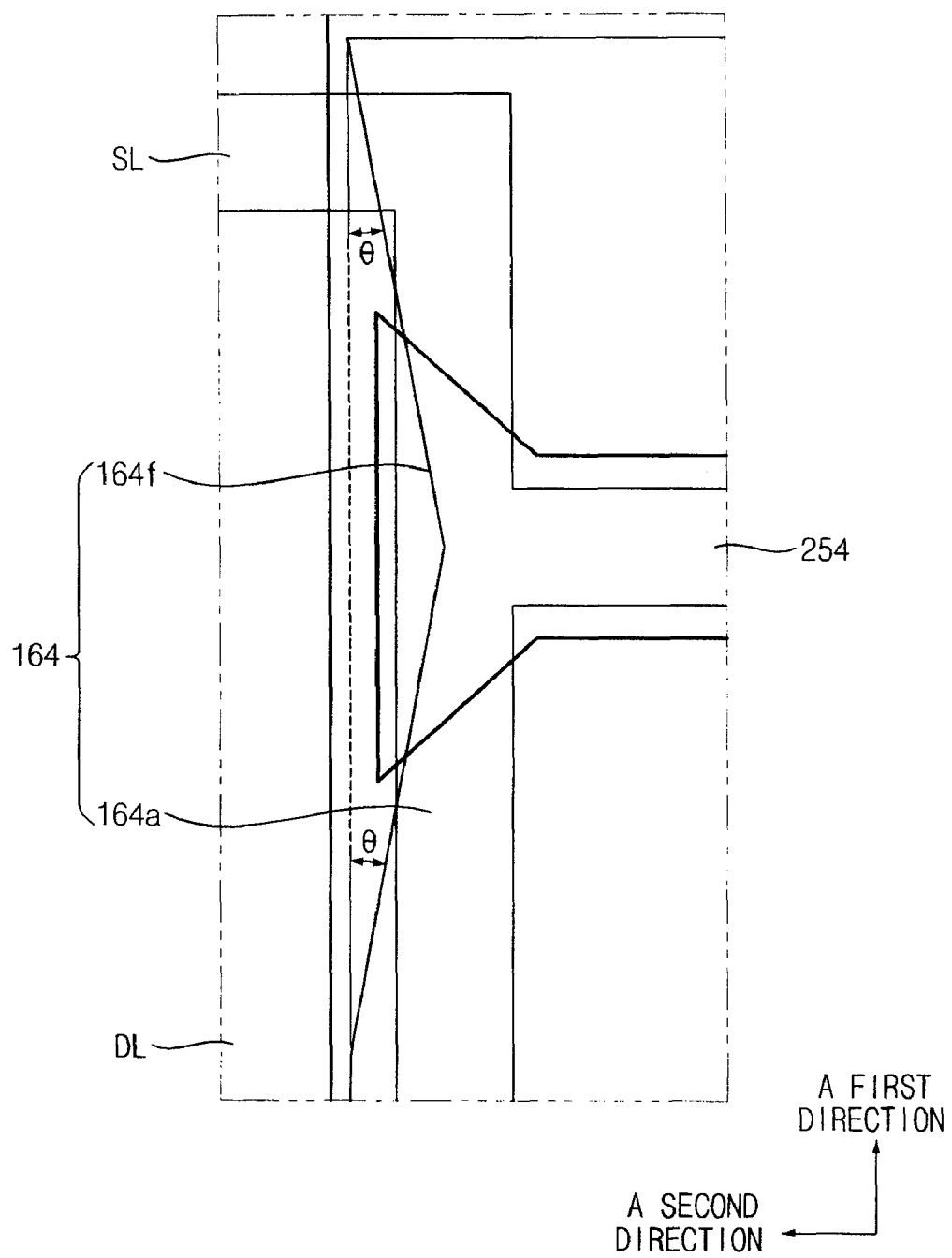
FIG. 9 is a plan figure showing one part of the pixel according to a fourth embodiment of this invention.

FIG. 9 is a plan figure showing one part of a pixel, according to a fourth embodiment of this invention.

Referring to FIG. 9, the electric field controller 164f is concave and is removed from the lateral side of the main body part 164a in the second direction D2.

For example, the electric field controller 164f is concave, with a triangular recess in plan view and is desirably symmetrical about the center line of the upper domain division part 254. The electric field controller 164f may be concave, being trapezoidal or half-elliptical.

The electric field controller 164f desirably overlaps the lateral sides of the upper domain division part 254. The angle θ between the lateral side of the electric field controller 164f and the lateral side of the main body part 164a may be 2~22.5 degrees.

Figure 10:
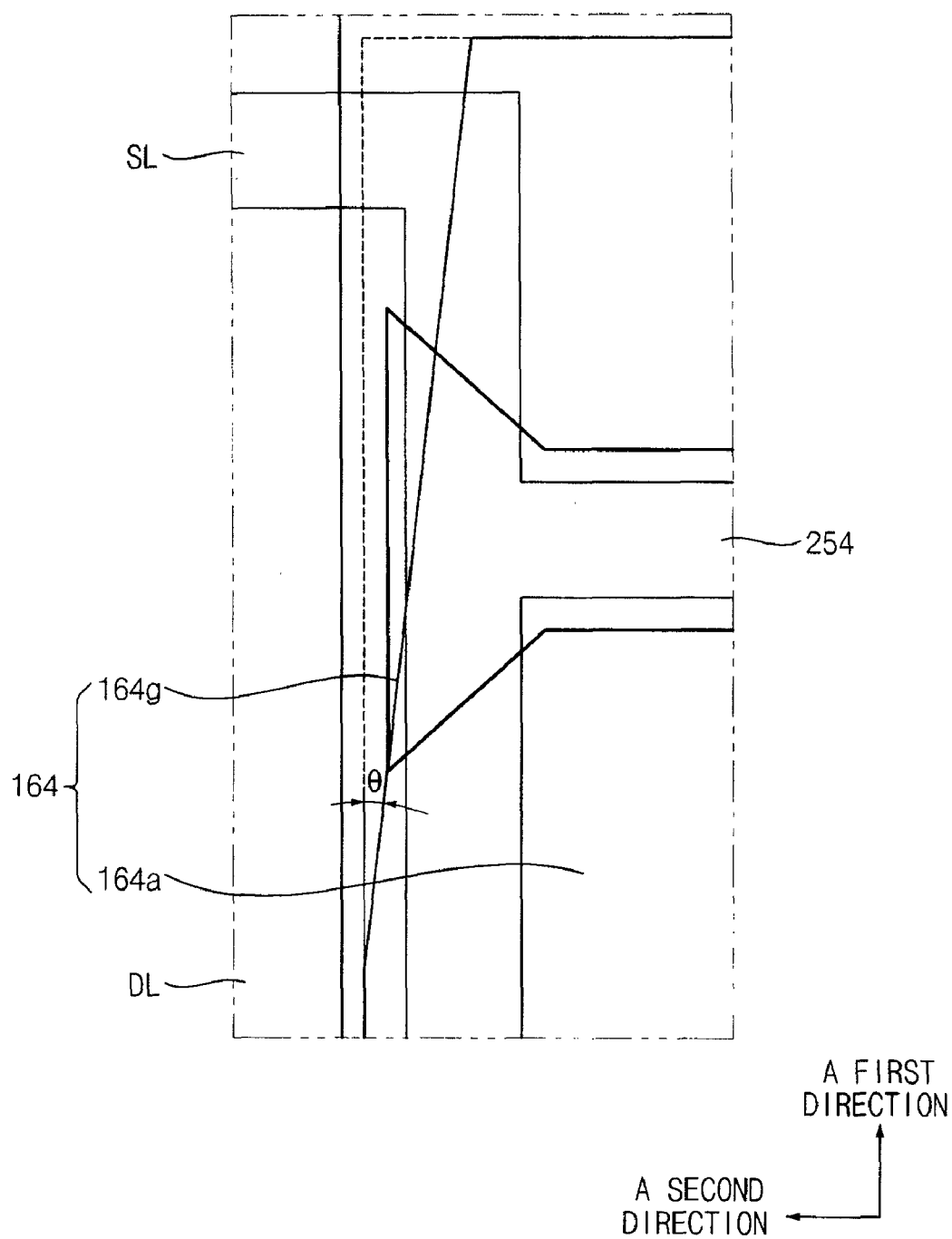
FIG. 10 is a plan figure showing one part of the pixel according to a fifth and sixth embodiments of this invention.
Figure 11:
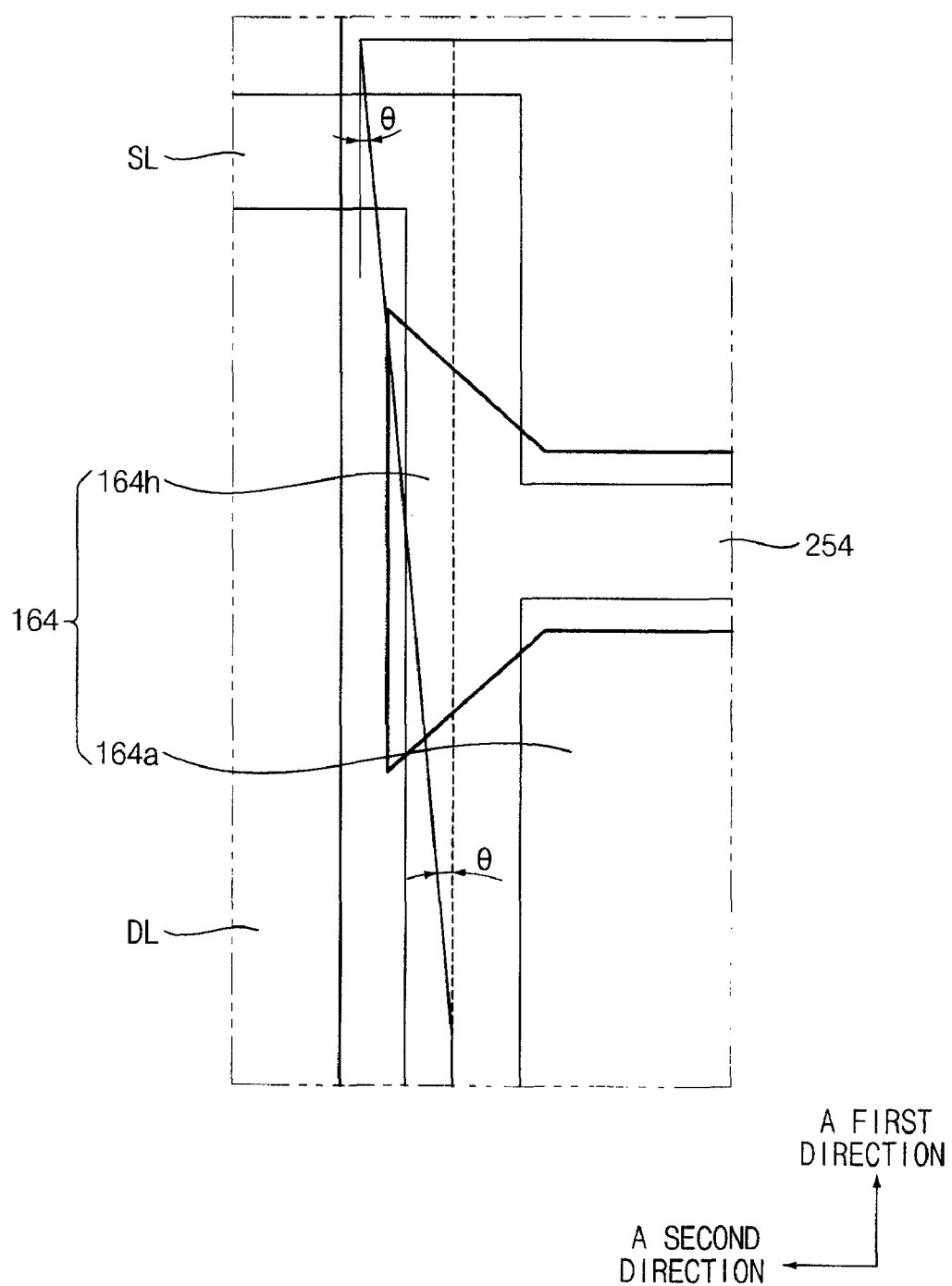
FIG. 11 is a plan figure showing one part of the pixel according to fifth and sixth embodiments of this invention.

FIG. 10 and FIG. 11 are plan figures showing one part of pixel, according to fifth and sixth embodiments of this invention, respectively.

Referring to FIG. 10 and FIG. 11, the electric field controllers 164g and 164h each have a removed portion which is removed at the top corner of the lateral side of the main body part 164a. The removed portion may be an inverted right angled triangle or a right-angled triangle.

The electric field controllers 164g and 164h desirably overlap the lateral sides of the upper domain division part 254. The angle θ between the lateral side of the electric field controller 164b and the lateral side of the main body part 164a may be 2~22.5 degrees.

Figure 12:
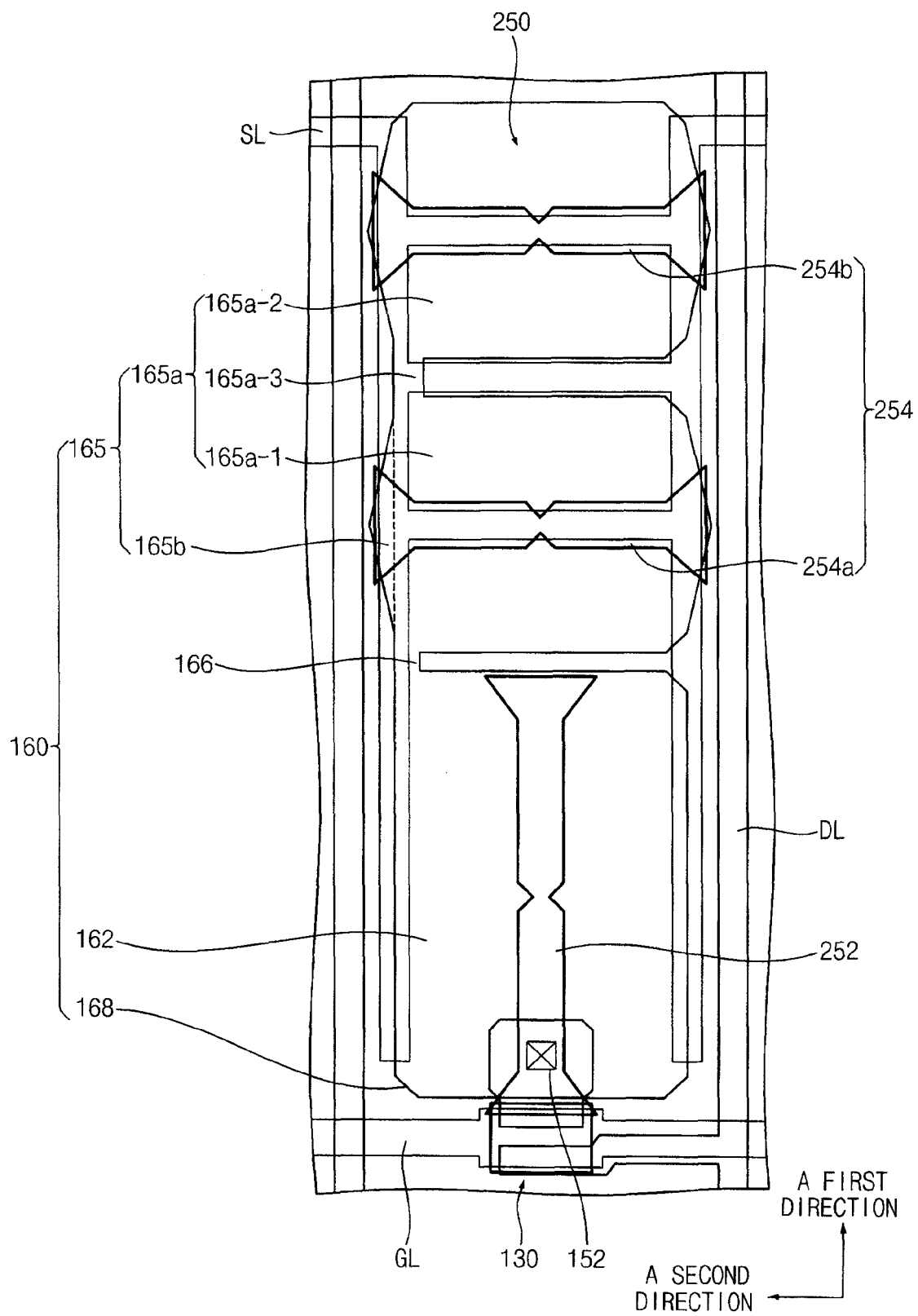
FIG. 12 is a plan figure showing one part of the pixel according to a fifth embodiment and sixth of this invention.

FIG. 12 is a plan figure showing one part of pixel according to a seventh embodiment of this invention.

Referring to FIG. 12, the upper part electrode 164 includes a main body part 164a and an electric field controller 164b.

The main body part 165a includes the first main body part 165a-1, the second main body part 165a-2 and a connection body part 165a-3.

The first main body part 165a-1 is rectangular and is electrically coupled to the lower part electrode 162 by a hitch 166.

The second main body part 165a-2 is rectangular and is formed apart from the first main body part 165a-1 in the first direction D1.

The connection body part 165a-3 is formed between and connects the first and the second main body parts 165a-1 and 165a-2.

The electric field controller 164b is formed at the lateral sides of the main body parts 165a-1 and 165a-2 in the second direction to control the direction of the electric field.

The electric field controller 164b may be convex, with a triangular, (e.g., in the form of an isosceles triangle), trapezoidal, or half-elliptical protrusion in the second direction.

In FIG. 12, the electric field controller 164b is shown having protrusion that is an isosceles triangle.

The electric field controller 164b may be concave, with a triangular, half-elliptical, or a trapezoidal recess in the second direction.

The upper domain division part 254 includes a first upper domain division part 254a and a second upper domain division part 254b.

The first upper domain division part 254a faces the first main body 165a-1 and is formed in the second direction in order to overlap the center of the first main body 165a-1.

The second upper domain division part 254b faces the second main body 165a-2 and is formed in the second direction in order to overlap the center of the second main body 165a-2.

Both edges of the first and second upper domain division parts 254a and 254b may be trapezoidal. The centers of the first and the second upper domain division parts 254a and 254b may be concave, with a triangular along the first direction D1.

Figure 13:
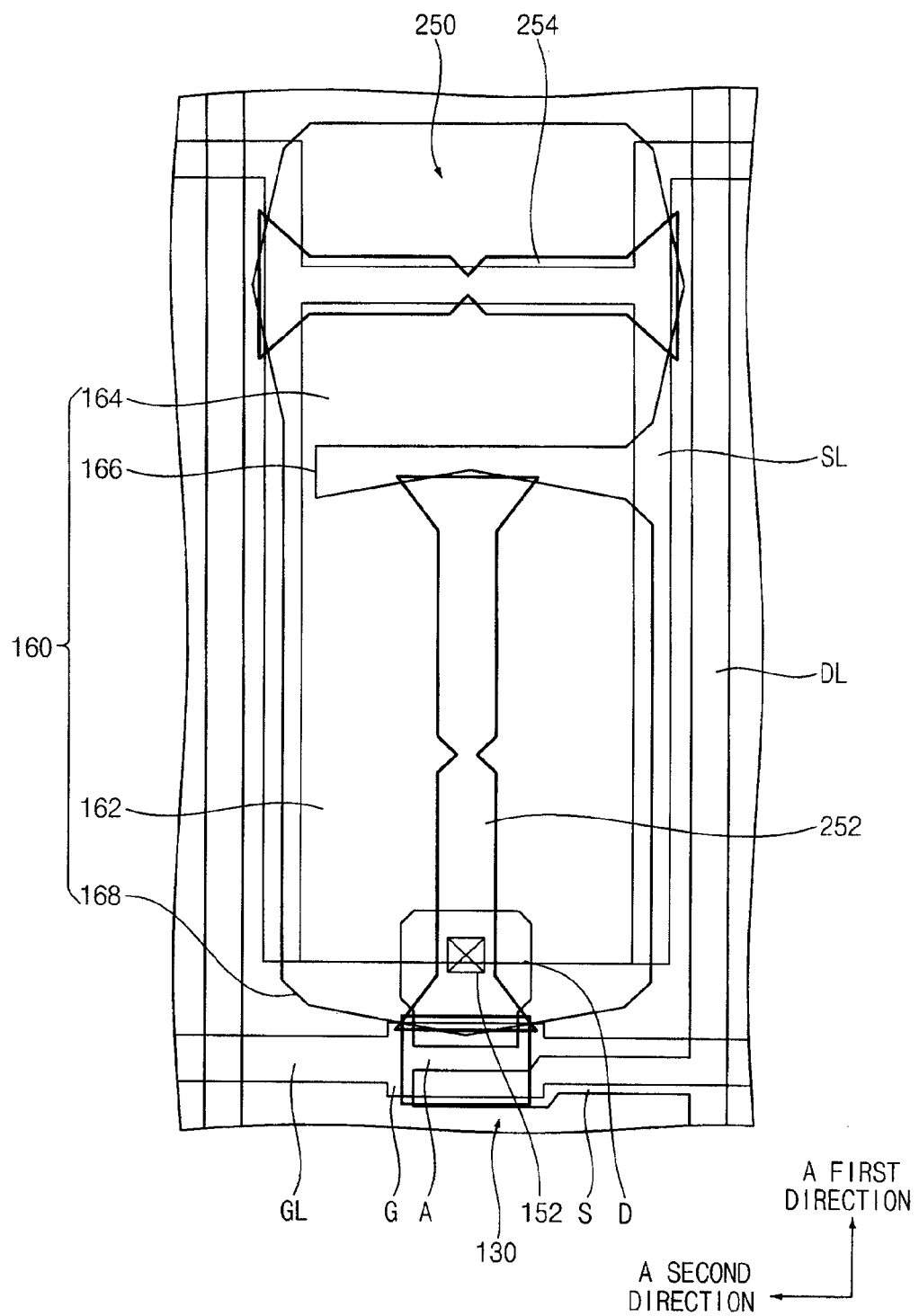
FIG. 13 is a plan figure showing one part of the pixel according to an eighth embodiment.
Figure 14:
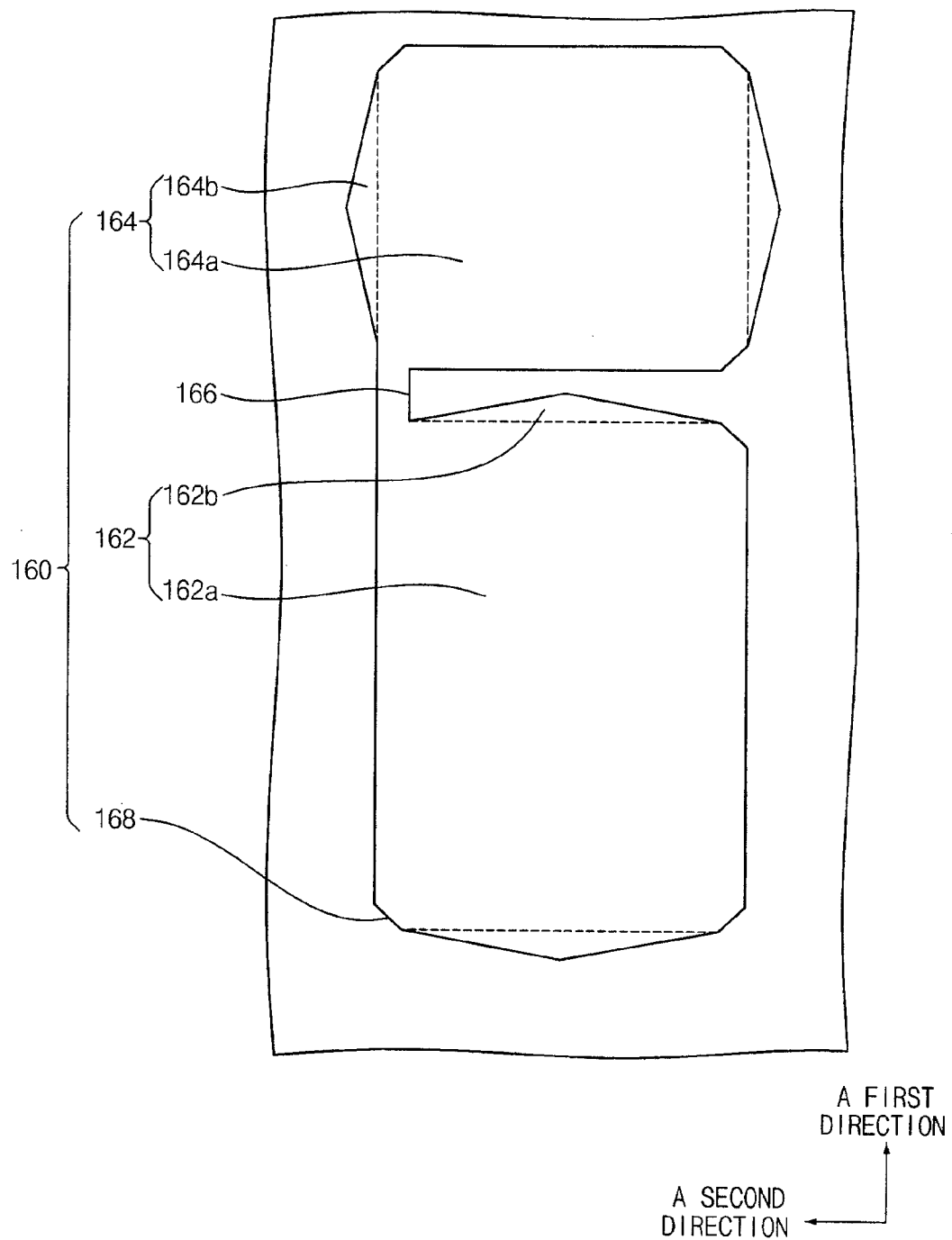
FIG. 14 is a plan view showing a pixel electrode for the pixel of FIG. 13.

FIG. 13 is a plan figure showing one part of pixel, according to an eighth embodiment. FIG. 14 shows a pixel electrode of the pixel of FIG. 13.

Referring to FIGS. 13 and 14, a pixel electrode 160 includes a lower part electrode 162, an upper part electrode 164 and a hitch 166.

The lower part electrode 162 is formed apart from the gate line GL in the first direction D1. The lower part electrode 162 is electrically coupled to the drain electrode of the thin film transistor 130 through the contact hole 152.

The lower part electrode 162 includes a lower main body part 162a and a lower electric field controller 162b. In plan view, the lower main body part 162a is desirably substantially rectangular.

The lower electric field controller 162b extends in the first direction from both sides of the lower main body part 164a.

The lower electric field controller 162b may be an isosceles triangle, an equilateral triangle, trapezoidal or half-elliptical.

The lower electric field controller 162b is convex at one side of the lower main body part 162a in the first direction. The convex portion may be triangular, half-elliptical and trapezoidal.

The upper part electrode 164 is formed apart from the lower part electrode 162 in the first direction. The lower part electrode 162 and the upper part electrode 164 are electrically coupled to each other thorough the hitch 166 formed therebetween.

The upper part electrode 164 includes an upper part main body part 164a and an upper electric field controller 164b. The upper main body part 164a is coupled electrically to the lower part electrode 162 through the hitch 166. In plan view, the upper main body part 164a is desirably rectangular.

The upper electric field controller 164b is extended in the second direction from both sides of the upper main body part 164a. The upper electric field controller 164b may have a convex or concave portion that is triangular (e.g., in the form of an equilateral triangle), half-elliptical, or trapezoidal.

The lower main body part 162a and the upper main body part 164a may have removed portions 168 which are removed from the corners of the lower main body part 162a and the upper main body part 164a. The removed portion may be 45 degrees relative to the first direction D1 or second direction D2.

According to this invention, as the electric field controller is formed at the lateral surface of the main body part to control the direction of the electric field that is applied at both edges of the main body, liquid crystals are prevented from running parallel to an optical axis of the upper or the lower polarizing plate. As a result, the image quality can improve without darkening in one part of the unit pixel.

While the present invention has been particularly shown and described with reference to exemplary embodiments thereof, it will be understood by those skilled in the art that various changes in form and details may be made therein without departing from the spirit and scope of the invention as defined by the following claims and equivalents thereof.

What is claimed is:

1. A liquid crystal display device comprising:
a lower substrate including a pixel electrode and a thin film transistor coupled to the pixel electrode;
an upper substrate including a common electrode; and
a liquid crystal layer interposed between the lower substrate and the upper substrate;
wherein the pixel electrode includes a main body part and an electric field controller,
wherein the electric field controller includes one of a convex portion protruding from a lateral side of the main body part and a concave portion recessed from the lateral side of the main body part; and
wherein each of the portions of the electric field controller has a general shape that is one of an isosceles triangle, an isosceles trapezoid, and a right triangle; and
wherein an included angle between a lateral side of the shape of the included portion of the electric field controller and a corresponding lateral side of the main body part is in a range of about 2 to about 22.5 degrees.

2. The liquid crystal display device according to claim 1, wherein the main body part includes a lower main body part, an upper main body part and a hitch for electrically connecting the lower and upper main body parts.

3. The liquid crystal display device according to claim 2 further comprising a lower domain division part and an upper domain division part in the common electrode.

4. The liquid crystal display device according to claim 3, wherein the upper domain division part faces the center of the upper main body part in a second direction.

5. The liquid crystal display device according to claim 3, wherein the lower domain division part faces the center of the upper main body part in a first direction and the upper domain division part is formed facing the center of the lower main body part in a second direction.

6. The liquid crystal display device according to claim 3, wherein each of the lower domain division part and an upper domain division part includes an opening area.

7. The liquid crystal display device according to claim 3, wherein each of the lower domain division part and an upper domain division part includes a protrusion area.

8. The liquid crystal display device according to claim 2, wherein the electric field controller includes an upper electric field controller connected to the upper main body part.

9. The liquid crystal display device according to claim 8, wherein the electric field further includes a lower electric field controller connected to the lower main body part.

10. The liquid crystal display device according to claim 9, wherein an angle between the lateral side of the upper main body part and a lateral side of the upper electric field controller is from about 2 to about 22.5 degrees, and an angle between the lateral side of the lower main body part and a lateral side of the lower electric field controller is from about 22 to about 22.5 degrees.

11. The liquid crystal display device according to claim 8, wherein the upper electric field controller has a convex portion which protrudes from a lateral side of the upper main body part.

12. The liquid crystal display device according to claim 8, wherein the upper electric field controller has a concave portion which is recessed from a lateral side of the main body part.

13. The liquid crystal display device according to claim 11, wherein the lower electric field controller has a convex portion protruding from an upper lateral side or a lower lateral side of the lower main body part,
wherein the convex portion of the lower electric field controller protrudes in a first direction, and the convex portion of the upper electric field controller protrudes in a second direction substantially perpendicular to the first direction.

14. The liquid crystal display device according to claim 12, wherein the lower electric field controller has a concave portion recessed from an upper lateral side or a lower lateral side of the lower main body part,
wherein the concave portion of the lower electric field controller is recessed in a first direction, and the concave portion of the upper electric field controller is recessed in a second direction substantially perpendicular to the first direction.

15. The liquid crystal display device according to claim 8, wherein the upper electric field controller is symmetrically formed at both lateral sides of the upper main body part.

16. The liquid crystal display device according to claim 2, wherein the main body part includes removed portions at corners of the lower and upper main body parts which are rectangular.

17. A liquid crystal display device comprising:
a lower substrate including a pixel electrode including an electric field controller, a lower main body part and an upper main body part which are electrically coupled by a hitch;
an upper substrate including a lower domain division part and an upper domain division part in a common electrode; and
a liquid crystal layer interposed between the lower substrate and the upper substrate;
wherein the lower domain division part is formed along a first direction, and the upper domain division part and the electric field controller are formed along a second direction;
wherein the electric field controller includes an upper electric field controller connected to both lateral sides of the upper main body part;
wherein the upper electric field controller includes one of convex portions protruding from lateral sides of the upper main body part and concave portions recessed from the lateral sides of the upper main body part;
wherein the portions of the upper electric field controller each have a general shape that is one of an isosceles triangle, an isosceles trapezoid, and a right triangle; and
wherein an angle between a lateral side of each shape and a lateral side of the upper main body part is in a range of about 2 to about 22.5 degrees.

18. The liquid crystal display device according to claim 17, wherein the upper domain division part faces the center of the upper main body part along a second direction.

19. The liquid crystal display device according to claim 15, wherein the lower electric field controller is symmetrically formed at an upper lateral side and a lower lateral side of the lower main body part.

20. The liquid crystal display device according to claim 17, wherein the electric field controller further includes a lower electric field controller connected to an upper lateral side and a lower lateral side of the lower main body part,
wherein the lower electric field controller includes a convex portion which protrudes from the upper and lower lateral sides of the lower main body part or a concave portion which is recessed from the upper and lower lateral sides of the lower main body part,
wherein the convex or concave portion of the lower electric field controller has a polygonal shape selected from an isosceles triangular shape, an isosceles trapezoid shape and a right triangular shape, and
wherein an angle between a lateral side of the polygonal shape of the lower electric field controller and the lateral side of the lower main body part is in a range of 2 to 22.5 degrees.

* * * * *